United States Patent
Boulware

(10) Patent No.: US 6,678,666 B1
(45) Date of Patent: Jan. 13, 2004

(54) METHOD OF CONDUCTING ANTI-FRAUD ELECTRONIC BANK SECURITY TRANSACTIONS HAVING PRICE-DATE-TIME VARIABLES AND CALCULATING APPARATUS THEREOF

(76) Inventor: Van W. Boulware, 2422 S. 96th St., #J106, Tacoma, WA (US) 98444

( * ) Notice: Subject to any disclaimer, the term of this patent is extended or adjusted under 35 U.S.C. 154(b) by 11 days.

(21) Appl. No.: 09/587,712

(22) Filed: Jun. 5, 2000

(51) Int. Cl.⁷ .............................................. G06F 17/60
(52) U.S. Cl. ........................................ 705/66; 705/78
(58) Field of Search .................... 705/65–67, 72, 705/75, 77–79, 44; 235/379

(56) References Cited

U.S. PATENT DOCUMENTS

| | | | | |
|---|---|---|---|---|
| 4,264,782 A | * | 4/1981 | Konheim .................... 340/5.73 |
| 4,578,530 A | * | 3/1986 | Zeidler ........................ 380/277 |
| 4,614,861 A | * | 9/1986 | Pavlov et al. ................ 235/375 |
| 4,745,267 A | * | 5/1988 | Davis et al. ................. 235/379 |
| 4,926,325 A | | 5/1990 | Benton et al. ............... 364/408 |
| 5,163,098 A | * | 11/1992 | Dahbura ....................... 705/75 |
| 5,485,510 A | | 1/1996 | Colbert ........................ 379/145 |
| 5,602,919 A | * | 2/1997 | Hurta et al. ................. 235/384 |
| 5,671,279 A | * | 9/1997 | Elgamal ...................... 380/29 |
| 6,018,717 A | * | 1/2000 | Lee et al. ...................... 705/13 |
| 6,023,682 A | | 2/2000 | Checchio ..................... 705/18 |
| 6,052,675 A | | 4/2000 | Checchio ..................... 705/44 |
| 6,064,988 A | * | 5/2000 | Thomas ........................ 705/38 |
| 6,073,118 A | | 6/2000 | Gormish et al. ............... 705/39 |
| 6,185,307 B1 | * | 2/2001 | Johnson, Jr. ................. 380/270 |
| 6,343,361 B1 | * | 1/2002 | Nendell et al. ............. 380/277 |

FOREIGN PATENT DOCUMENTS

JP            401243175 A    *    9/1989

OTHER PUBLICATIONS

"A Security Token of Appreciation 20,000 First Union Clients Get Transfer–Enabling Devices", Feb. 3, 1999, Phillips Business Information, vol. 19.*

* cited by examiner

Primary Examiner—John W. Hayes
Assistant Examiner—M. Huseman
(74) Attorney, Agent, or Firm—R. Keith Harrison

(57) ABSTRACT

A method of computing and verifying an authorization code for a transaction. The method includes creating an algebraic formula and storing the formula in a validation unit and a calculating apparatus. A calculation is made by entering values for variables of the formula into the calculating apparatus, which substitutes the values for the variables into the algebraic formula to calculate a value for an authorization code. The variables and calculated value for the authorization code are sent to the validation unit, which calculates the authorization code and determines a match between the values for the variables as determined by the calculating apparatus and the values as verified by the validation unit. The validation unit allows payment authorization only if a match exists between the values for the variables as determined by the calculating apparatus and as verified by the validation unit.

16 Claims, 5 Drawing Sheets

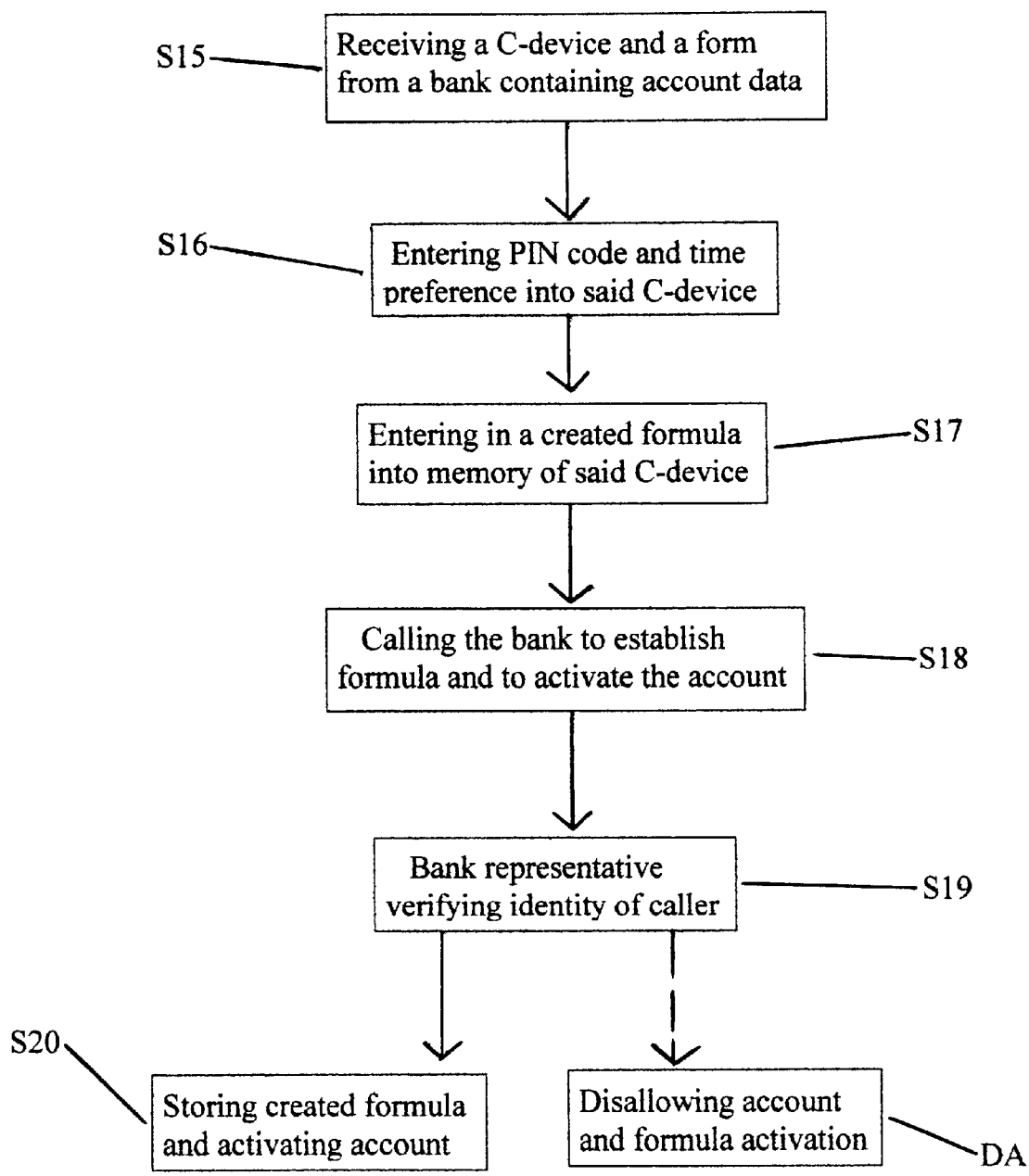

METHOD OF CONDUCTING ANTI-FRAUD ELECTRONIC BANK SECURITY TRANSACTIONS HAVING PRICE-DATE-TIME VARIABLES AND CALCULATING APPARATUS THEREOF

I. BACKGROUND

1. Field of Invention

This invention relates primarily to accounts such as credit card accounts, checking and/or savings accounts, and any related method of electronic funds. Also note that this invention can take many forms and it is the purpose of this draft to explain the most common embodiments of this invention. This invention includes a compact, portable calculating apparatus having a memory for storing a price and an internal clock for conveniently determining the time and/or date value for computing an authorization code and its use for calculating and allowing a vendor to store protected, anti-fraud bank security deposits for annual fees and other purposes, even after the later changing of a formula by the account holder.

It is well known in the prior art that traditional credit cards and other accounts can be overcharged and fraudulently used. The main purpose of this invention is to prevent credit card fraud and to simultaneously allow a vendor to make an annual fee or other charge to a credit-card user's account, even after constant changing of one's own formula, which comprises variables of date, time, and price.

2. Description of Prior Art

U.S. Pat. No. 5,485,510 to Raymond O. Colbert (Jan. 16, 1996) mentions a way of providing a method to produce an authorization code that keeps the account number of a card confidential. This method normally requires the account holder to call in to receive an authorization code from a bank and send the code to a merchant for a purchase. The account holder makes a purchase by providing an authorization code and not the account number to a vendor, ensuring its security. This prior art patent discloses a way to include a time limit for a vendor to make a charge, but does not mention any method of providing to an account holder a calculating apparatus that can conveniently store on file a preset formula which can be used to make purchases possible, nor does the prior art patent disclose any portable apparatus having an internal clock for creating the necessary time and/or date restrictions. This method also only explains a method of making phone transactions safer against fraud, but does not protect against fraudulent charges made by someone who documents your account number and makes charges by other methods.

In U.S. Pat. Nos. 6,023,682 and 6,052,675 to R. Checchio (They disclose the same invention.), a method is explained for using an apparatus to determine whether or not a credit card user is an authorized user during a transaction. In use, an authorized user makes a purchase by first entering a price into a purchase apparatus, which is then encrypted into a code using a pre-stored PIC as a "key". The method explains that the credit card number, and the "purchase token" are then transferred to a merchant, who then transfers the data to a verification system to determine whether or not a user is an authorized user. Only an authorized user and the bank have knowledge of the confidential PIC, which a verification system uses to compare a "test token" with a "purchase token"; and that a third party who gets access to a lone credit card cannot use it without the confidential PIC. This only allows the merchant to determine whether or not a user is authorized, and the main flaw is that a dishonest merchant, whom allows an authorized user to use one's card at a vendor location, can use a valid "test token" repeatedly for a multiple charge amount.

Since the purpose behind U.S Pat. No. 6,052,675 was simply to determine whether a card-user is the real user when making a purchase (without comparing signatures), its inventor failed to recognize that also including time-date data as well as price encryption information would stop a merchant from fraudulently using a credit card at all. The patent just explains that a calculating apparatus to produce a "purchase token" may contain various types of information for validating that a user is authorized to make a transaction. In addition, U.S. Pat. No. 6,052,675 to R. Checchio, does not even mention the idea of a calculating apparatus having an internal clock for encrypting time AND date data into a "purchase token" nor does it explain whether or not a merchant having prerecorded data can use the exact same price and credit card data again (on the SAME DAY) for a duplicate charge. The method disclosed in U.S. Pat. No. 6,052,675 to R. Checchio simply cites that a string of data "CAN also include other types of information, for example, vendor name, type of lease, type of purchase, date of sale, category of merchandise, location of the vendor or any other relevant piece of information . . . that would serve to distinguish a particular purchase or lease transaction."

If a bank allows a "purchase token" or authorization code having valid purchase amount data to be used more than once on the same day, a merchant can use the same information over and over for multiple charges of the same purchase amount. This would breach security to a cardholder. Since it is such a critical function of a calculating apparatus to have its own internal clock to produce time data (and not JUST date data) restrictions to correctly perform, but no calculating apparatus with an internal clock to produce a time figure is mentioned in U.S. Pat. No. 6,023,682 to R. Checchio OR in U.S. Pat. No. 5,485,510 to Raymond Colbert (even though the first cites the latter!), an internal clock within a calculating apparatus to produce time-date variables, therefore, cannot be considered obvious. It is, once again, very important to provide a method so that a person who has a card number cannot increase the price of a charge, make a charge again with the same price on a different date and/or time, or make a valid charge again with the same date-time-price data once a valid charge is withdrawn.

Also, other flaws of U.S. Pat. Nos. 6,023,682 and 5,485,510 can be recognized after being thoroughly explained. It is well known that some companies, such as car rentals, require a credit card number to be held as a payment option so that any losses to the company can later be compensated by charging a predetermined amount on the credit card. This is known as a security payment option. The main problem with U.S. Pat. No. 5,485,510 to Raymond O. Colbert, is that without an advanced system of storing and verifying Price-Date-Time data by a bank, security deposits, annual fees, and later payments would have difficulty being collected at a later date when a formula is changed by the cardholder. An account holder may find it necessary to communicate price, date and other data to a merchant for being held as a security deposit, then change a formula for producing an authorization code if its user thinks that a particular merchant, after being visited by the particular customer for a long time, has determined a pattern to produce an authorization code.

Also, if a dishonest person somehow acquires a cardholder's formula, the account holder should be able to change his formula without blocking any annual fees or other services that are put on a particular credit card. There would be a great inconvenience in having to call the account holder, get his authorization code and all variables associated with a purchase that utilizes a newly created formula, then run the account to collect payment from the credit card user. This can be extremely problematic if an account holder decides to damage merchandise such as a car and be called to get his authorization code. In most instances, the account holder after having damaged merchandise may not want to give the required information for the merchant to collect payment. This would in turn defeat the purpose as to why the company held the account number on record and would negate the reason to holding a credit card number.

Also, U.S. Pat. No. 6,052,675, does not disclose any method to avoid this problem if a formula or "key" is changed. Another method for the company to do in this instance would be to charge the card in advance and hold the deposit in a savings account. This can be troublesome for two reasons. One, the drop in credit may seriously render the ability of the account holder for other necessary purchases. Second, the resulting bank fees and interest from withdrawing funds may affect the account holder even if the funds are later returned. After very careful examination, one realizes that there needs to be a systematic method of security measures to prevent fraud by providing price, date, and other variables to produce authorization codes, yet still allow an account holder to change one's own formula, and still allow companies to collect security deposits if needed without interest charge complications. Again, after careful examination, the reader realizes that not every system for providing authorization codes is flawless, convenient, or perfectly secure. Thus, the industry needs a method of producing a safe credit card transaction without the above limitations.

The prior art references contain disadvantages and furthermore fail to disclose:

(a) a systematic method of producing an authorization code so that electronic security deposits may be held by a company, even after the later changing of a formula by an account holder, without accruing interest or other fees to the account holder;

(b) a method of security to prevent hackers from running prerecorded account numbers with guessed variables and authorization codes;

(c) a method of calculating an authorization code by providing a portable, formula-storing calculating apparatus having an internal clock for conveniently calculating the date, time, and price to produce an authorization code so that a merchant cannot use the exact same credit card number and price data (on the same day) for a double charge;

(d) III. Description of Terms: The reader may refer to the following lettered terms for meaning as these terms are used throughout the disclosure. These given terms are by no means to limit the scope of the invention, as they are not claims, but are only provided to help the reader understand, make, and use the preferred embodiment of the present invention.

(a) C=C-device: preferably a small calculating device with a securely stored, changeable algorithm or formula for calculating authorization codes, preferably taking the form of a durable, metallic credit card with a computer chip embedded within, said calculating device preferably having a small liquid crystal display (LCD) screen to display an authorization code and the date and time used to create such a code, said calculating device preferably having numeric keys similar to that of a calculator to allow the entering of the changeable, stored formula and the entering of a price P for purchases, said calculating device preferably containing a magnetic stripe and/or an electronic signal device preferably being read-only-memory means with said stored formula being stored along a parallel circuit at the time of a data transmission, whereby allowing the transfer of data to a merchant's reading device without said formula being readable or changeable by said reading device during the transfer of data during a purchase transaction.

(b) R=R-device: the payee or merchant reading device used to run or process the information being sent from a C-device, said reading device preferably containing a card slot wide enough to allow said C-device to be swiped through and read by said reading device, said reading device also preferably containing an electronic sensor capable of receiving an electronic signal from said C-device, said reading device also preferably containing a symbolic keypad so that values such as the price, authorization code, and serial number of any C-device can also be manually entered for distant purchases, said reading device also preferably containing modem means whereby allowing said reading device to communicate with a distant verification device of a bank or financial institution and collect electronic payment.

(c) V=V-device: the verification device of a bank or financial institution that has an exact copy on file of a C-device's customizable, preset formula for calculating an authorization code, said verification device also preferably storing the life range of any formula and preferably all past purchases along with date and time data of said past purchases, said verification device allowing a merchant's R-device to receive payment only with a correct authorization code and other correct account information and declining a merchant's R-device if there is an invalid authorization code or other invalid account information, whereby allowing an account holder the added security against fraudulent deductions.

(d) F=Formula: a C-device's own unique algebraic equation utilizing the variables of D, T, P, and a predetermined set of numbers in a predetermined fashion, said predetermined set of numbers and said variables being used in conjunction to produce an authorization code, said algebraic equation preferably being customizable by said C-device's own account holder, whereby allowing more security and flexibility to said account holder.

(e) PIN Code: a personal identification number or password an account holder must enter into a C-device in order to be able to operate or utilize said C-device's ability to calculate an authorization code, said password preferably being customizable or changeable by said account holder to allow own individual security, said password being necessary to be entered once every predetermined time period as determined preferably by said account holder, whereby allowing more convenience for said account holder to shop without reentering said password into said C-device until said predetermined time period.

(f) M=Merchant number: the license number issued by a bank or financial institution for the identification of an existing entity licensed to do business with said bank, said license number being used to identify the payee or receiving end of an existing account number.

(g) L=Location number: the web site address or tracking number used to identify the exact location of an R-device at the time of a transaction so that the merchant's position is known by the bank's verifying device, said web site address being one preferably at a preset location which is issued by the bank to allow or authorize said R-device to run account numbers and deduct funds.

(h) S=Serial number: the account number used to label any particular C-device, said account number being used to establish the identity of an existing entity's funds availability, said account number preferably being unique enough to establish individual identity over many other potential account numbers, said account number being integrated with the name of said existing entity.

(i) P=Price: the exact U.S. dollar value of a charge during the day and the time said charge was run, with dollars (d---d) first, and cents (c---c) next, said dollars (d---d) and cents (c---c) being separated with a decimal point, however, said dollar charge sometimes being estimated by dropping all fractions of a cent after the hundredths place.
P=($Price)=d---dc---c

| | |
|---|---|
| (a) $4,985.23001 = 4985.23001 | (d) $00.0157 = .0157 |
| (b) $124.352 = 124.352 | (e) $01.0156 = 1.0156 |
| (c) $123,901.01 = 123901.01 | (f) $1,365,789.17 = 1365789.17 |

(j) D=Date: using Standard Military Time, the day of a charge represented by the combination of numbers being run together, always beginning with a decimal point (.), followed by the 2-digit month (mm), followed by the 2-digit day (dd), and ending with all the digits of the year (y---y).
D=(Day)=.mmddy---y

| | |
|---|---|
| (a) D = Feb. 23, 2001 = .02232001 | (d) D = June 4, 1998 = .06041998 |
| (b) D = Dec. 6, 10140 = .120610140 | (e) D = Apr. 21, 2009 = .04212009 |
| (c) D = Jan. 1, 982 = .0101982 | (f) D = Nov. 10, 2545 = .11102545 |

(k) T=Time: using Standard Military Time, the time of a charge represented by the combination of numbers being run together, always beginning with a decimal point (.), followed by the 2-digit hour (hh), followed by the 2-digit minute (mm), and ending with all the digits of the second (s---s), however, said time sometimes being estimated by dropping all fractions of a second after the hundredths place.
T=(Time)=.hhmms---s

| | |
|---|---|
| (a) T = 14:33:31½ S.M.T. = .1433315 | (d) T = 00:00:01.01 S.M.T. = .00000101 |
| (b) T = 12:32:21.9 S.M.T. = .1232219 | (e) T = 12:01:59.1 S.M.T. = .1201591 |
| (c) T = 04:27:21.01 S.M.T. = .04272101 | (f) T = 00:02:01 S.M.T. = .000201 |

(l) A=Authorization Code: the resulting, computed number after a C-device has substituted the values of D, T, and P through said C-device's predetermined formula.

(m) K=Combination Number: the string of variables M, L, S, P, D, T, and A being run together in a predetermined sequence.

(n) R=Formula Life Range: the time span or range of the existence of a formula being represented by the exact date/time point of establishment of said formula, being followed by a hyphen (-), and ending with the exact date/time point of the alteration or deletion of said formula.
R=date/time point of establishment–date/time point of alteration or deletion
  (a) Feb. 23, 2001 14:21:21–Feb. 23,.2002 15:21:35 (Expired)
  (b) Jan. 21, 1982 02:02:21–Jan. 22, 1999 14:28:56 (To Date)
  (c) Dec. 19, 2045 08:09:25–Mar. 20, 2046 02:24:23 (Expired)

Important note: The formula life range is recorded at the establishment of the very first formula. The deletion point of an in-force formula would be verified as "to date" and the recording V-device would have a clock displaying the current date and time that variables of D-T would be allowed for use. Variables of D-T received by a V-device having a combined value later than what is displayed along the V-device's clock cannot be validated. For this reason, it is preferable to have a C-device's clock set slightly behind that of a V-device.

When a formula is deleted or changed, it is considered expired. A formula and its life range need only be stored when a charge-credit is recorded by a V-device during the life of said formula, since only charge-credit deposits can later be turned into available funds even after the life of said formula. A previous formula can then be deleted after all charge-credits during the formula life range of said previous formula have been used.

(o) Electronic Security Deposit: an electronic deposit being made by an account holder by giving a merchant S-P-D-T-A data to be run along a network and allowing the price P to be credited back to said account holder's serial number S so that the later changing of a formula F will not hinder later withdrawal of said price P by said vendor.

(p) Date/Time Combination or D-T Combination: a time-point being stored in memory by a V-device which is the exact moment of a charge to an account.

IV. OBJECTS AND ADVANTAGES

Besides the disadvantages of the prior art methods, several advantages of the present invention are:

(a) to provide a method where a PIN code must be entered into a C-device, but only as needed every predetermined time period, as established by the authorized user, so that a lost or stolen C-device cannot be used without reentry of said PIN code, as determined by the card holder's pre-established time period;

(b) to provide a method so that a formula F for calculating an authorization code can be conveniently-changed by the account-holder if said formula is discovered by someone other than the bank or account holder, but does not interfere with a third party from obtaining a preset limit of annual fees, nor compromises the security of the card holder;

(c) to provide a convenient method and system for calculating the value of an authorization code by providing a compact, versatile self-calculating apparatus with an internal clock, preset stored formula and variables of D for date, T for time, and P for price, so that calling to get an authorization code from a bank is unnecessary and fraudulent, double charges cannot be made on an account;

(d) to provide a convenient method for making purchases by requiring that an authorization code be necessary to validate any and all charges;

(e) to provide a method of making purchases by providing a C-device containing a transmitter with read-only-memory means and a pre stored formula being stored along a parallel circuit at the time of a data transmission, whereby said C-device is capable of transmitting an authorization code and given variables to an R-device without said C-device's preset formula F being readable or changeable by said R-device during the transmission;

(f) to provide a method that allows a merchant to be located when running an account number and only having an X number of times to run an invalid authorization code before not being able to run said account number at said location for a predetermined time period, whereby stopping hackers from guessing numbers and allowing possible investigation of said merchant;

(g) to provide a method of conveniently producing a formula for each individual account by allowing each account holder the luxury and flexibility of calling in to create one's own formula, whereby providing increased security to said account holder if the formula of a C-device is discovered.

(h) to provide specifications of a compact, versatile, and inexpensive calculating apparatus capable of being affordably mass produced by banks or financial institutions without the need for customization of every calculating apparatus, such as the stamping of each individual account holder's name, account number, or other data onto said calculating apparatus, but by instead allowing an authorized user the ability and flexibility of entering in one's own account information, storing one's own self-created formula, and storing one's own self-made PIN code and its reentry preferences into a generic, usable-by-anyone calculating apparatus.

V. REFERENCE SYMBOLS IN DRAWINGS

Figures and Reference Letters:

A=Number representing the Shift Value of a Function Key. Example: pressing 7/P when a 1 is displayed here would yield a 7; pressing the same key when 2 or 3 is displayed yields the second or third function, being the P.

B=positive or negative value of a number

C=LCD Screen

D=Location of the Built-in Electronic Radio Transmitter (Read-Only-Memory Design)

E=Card Swipe (Read-Only-Memory Design)

F=Function Key

H=MEM A=Memory A for storing Serial, PIN, and formula data in a C-device

I=Circuit for transmitting data from MEM A to MEM B

J=Switch for opening/closing of the circuit in I

K=MEM B=Memory B for temporarily storing received data from MEM A

Other Functions:

a) P, D, T, A Keys for entering variables into a formula b) $\pi$, $\div$, +,=, and other functions for building an equation utilizing P, D, T and A c) ln=letters-numbers for changing between numbers and the alphabet display d) cl=clock function for entering the time/date in a C-device's clock e) LC=Last Charge for using the exact same P, D, T, A data of a previous charge f) ENT=for Entering the value of a PIN, price, formula, or other values g) Sft→=Increase the Shift Value by 1 h) Sft→=Decrease the Shift Value by 1

BRIEF DESCRIPTION OF THE DRAWINGS

The invention will be better understood, by way of example, with reference to the accompanying drawings, wherein:

FIG. 6 is a flow diagram illustrating establishment of multiple accounts according to the present invention.

VI. DETAILED DESCRIPTION OF THE DRAWINGS

Figure 1:
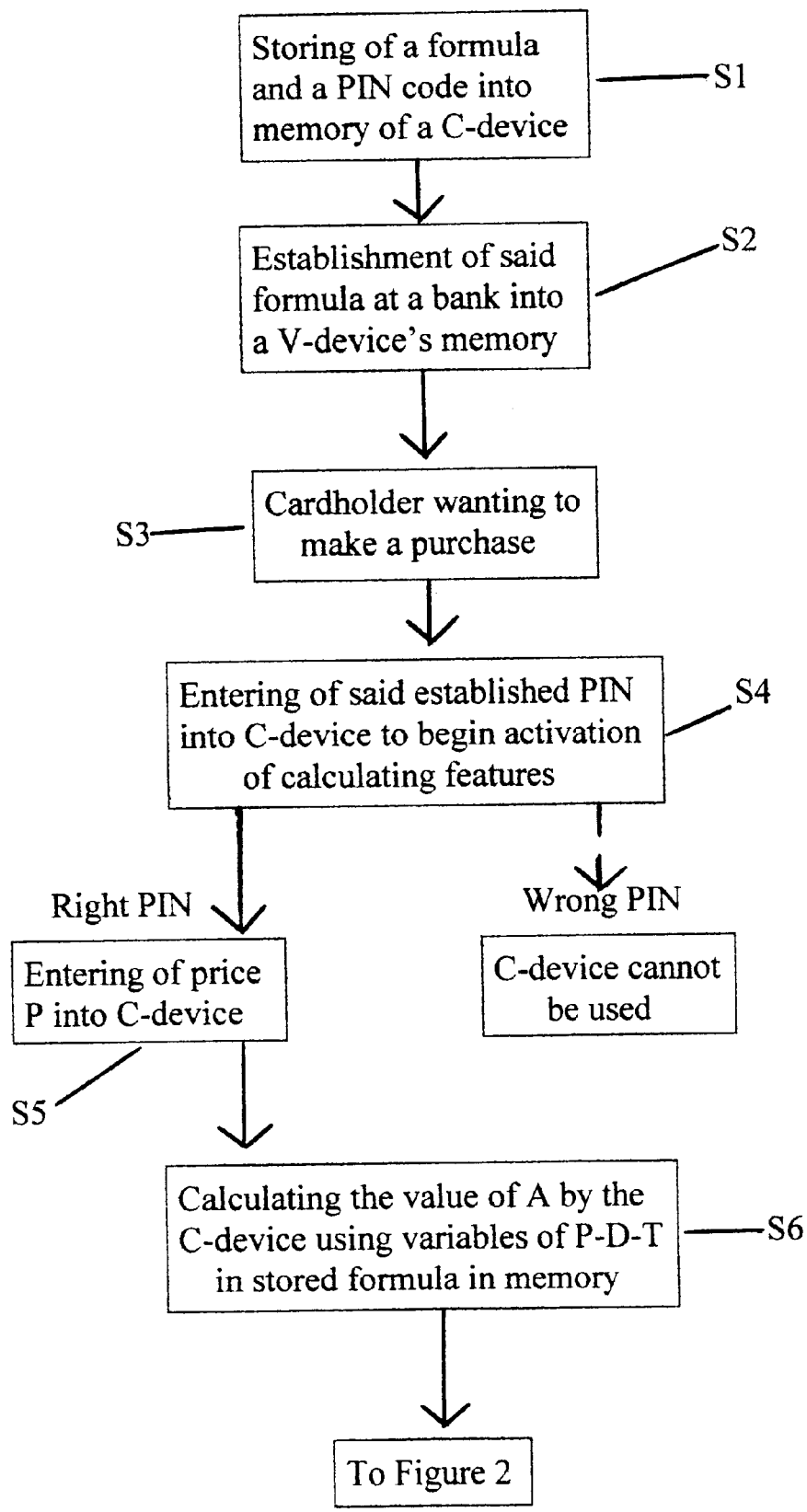
FIGS. 1 and 2 are flow diagrams illustrating sequential process steps according to a method of the present invention.

In S1 of FIG. 1, an account holder creates or establishes a PIN code and formula for calculating an authorization code and stores said data into the received C-device's memory. A formula can have predetermined requirements being limited to a preset palette of numbers and mathematical symbols to prevent undefined answers from occurring and to cut costs of having a large apparatus, but should also allow enough formula-making abilities for an account holder.

In S2 of the preferred embodiment, an account holder calls a bank and establishes the same formula previously stored in the C-device into the bank's records. A telephone representative can verify identity by requiring the correct answering of questions to begin account activation, or the traditional practice of verifying an authorized user by identifying the location of a call may also be used. The representative then enters the account holder's chosen formula into a computer system so that a V-device has on file a copy of the method used to compute an authorization code. Each account holder preferably calls in to make one's own formula so that a computer or other calculating means is unnecessary to produce a plurality of formulas. This also keeps the cost of producing formulas for every individual account holder down to a minimum.

When an authorized user wants to make a purchase, as in S3, the authorized user follows S4 and enters his preestablished PIN code into the C-device to begin activation of the C-device's calculating abilities. For the authorized user's own convenience, it is preferable to have a customizable feature that allows the calculating function of the C-device to remain operable after a preset time period so that constant reentry of a PIN code is unnecessary. The C-device turns on only if the code is correct. If the PIN is wrong, the dotted line path is followed. In the flowchart, the dotted line paths represent an incorrect path being taken, which all lead to an invalid message or a decline code.

Figure 2:
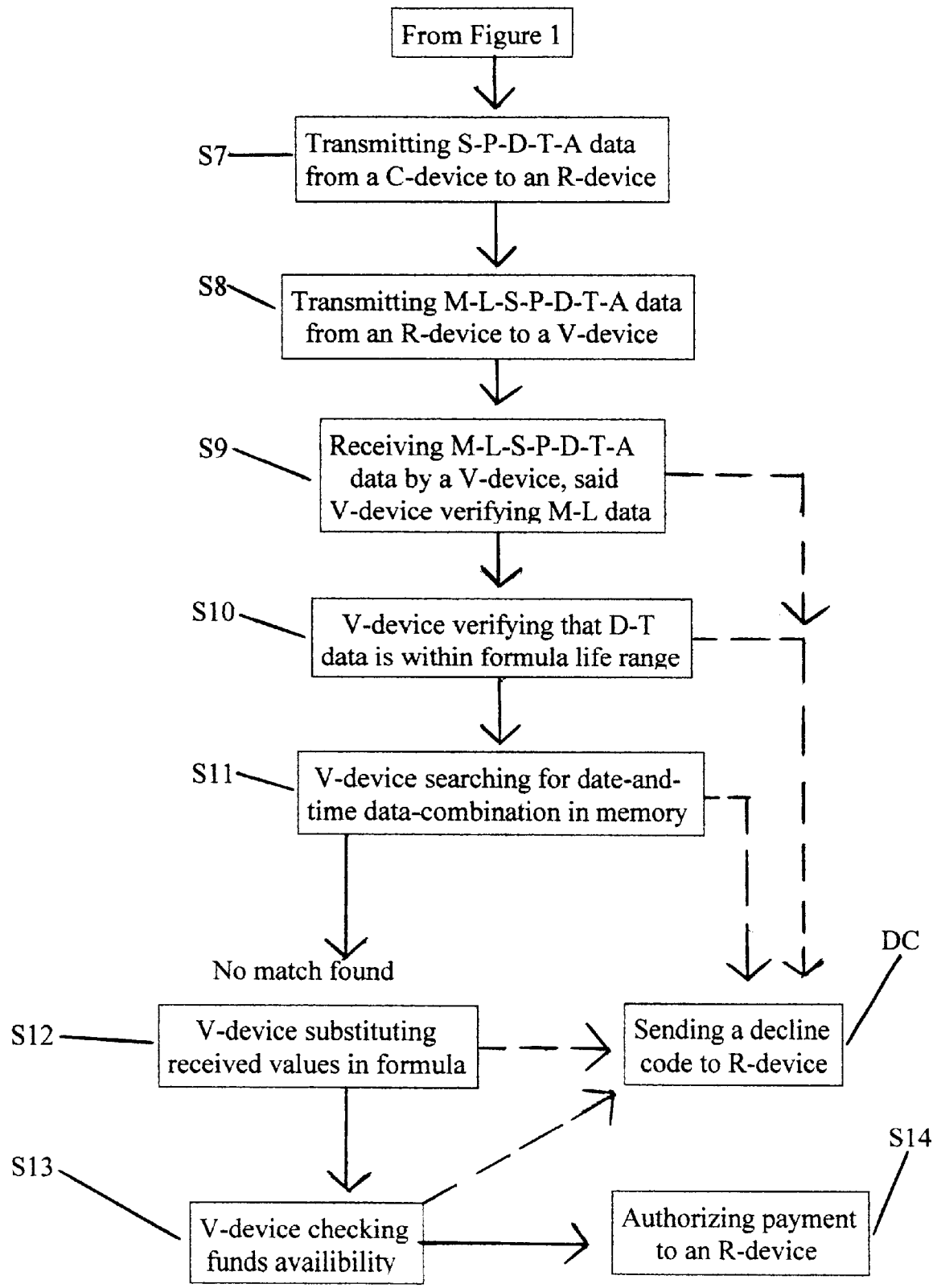

After activation, the authorized user enters the price P, being S5, into the C-device's input receiver. At S6, the C-device then calculates and displays an authorization code along with the current date and time used to determine that aforementioned authorization code. In S7 of FIG. 2, the C-device or account holder communicates or transmits the values of S-P-D-T-A to an R-device for payment submission.

At S8, the R-device receives the S-P-D-T-A data and transmits this along with the merchant's M-L data to a V-device. At S9, the required combination number, being M-L-S-P-D-T-A is received by a V-device for verification purposes. When the V-device receives the data it verifies that the merchant and location are valid and also verifies that the predetermined amount of invalid authorization code transmissions has not been expended for that particular merchant If the merchant is not licensed to do business, or has made too many invalid transmissions for that day, the dotted line path is followed. In S10, the V-device checks to see that the D-T combination is within the life range of the pre-established formula. It would not make sense for the V-device to receive a D-T combination representing a time period before the establishment of the account. If the combination is not within the range, the path changes to DC. If the D-T combination does check through, S11, being the V-device checking in its memory to see if the received D-T combination has been used for a previous charge. If a previous charge-credit was established into the V-device's memory, the same D-T combination may be allowed, but once a deposit is permanently withdrawn, it is stored into the memory of the V-device and the funds cannot be withdrawn twice. The path goes to DC if an R-device transmits a D-T combination that is found in memory.

If the D-T combination is not found in memory or is found but checks through, the V-device follows S12 and substitutes the received variables of S-P-D-T-A into the account holder's pre-established formula to determine if a match exists. When a match does not exist, the dotted line path is followed and the V-device stores the time of the invalid charge in a memory to be used as a point against the merchant. However, S13 shows that other predetermined factors may also be required by the bank to be satisfied, such as the account holder having sufficient funds or credit limit and that the C-device has not been reported lost or stolen. At S14, the V-device actually authorizes payment to the R-device. However, the V-device only allows payment authorization if the M-L data is valid, the merchant has not transmitted more than the allowed invalid messages, the D-T combination is within the formula life range, the received D-T combination has not been used twice as specified, all variables in the pre-established formula balance with the given authorization code, the credit limit is sufficient, and the C-device has not been reported lost or stolen.

Figure 3:
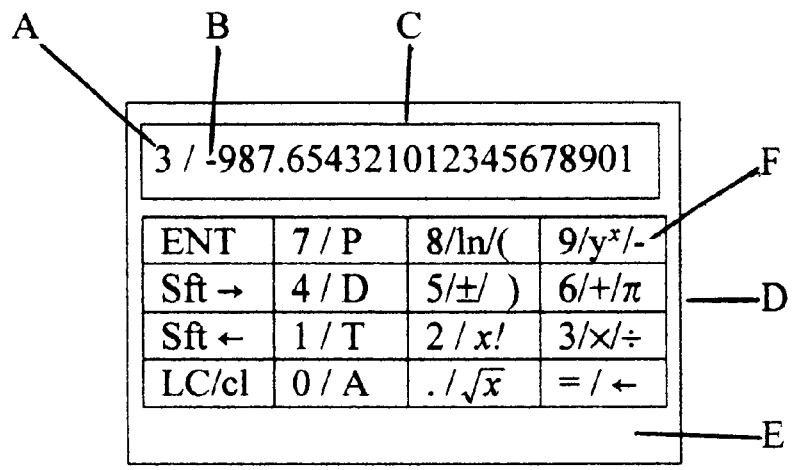
FIG. 3 is a front view of a C-device suitable for implementation of the present invention.

In FIG. 3, the front side of a C-device is shown. When a C-device is received by an authorized user, one uses the cl key to establish the time. The authorized user then uses the In key to bring up the alphabet screen, uses the shift keys to move back and forth along the LCD, and presses ENT to enter in a selected letter. The user does this for all letters until the account holder's legal name has been stored. A formula can be stored using the variables of D, T, P, A, being arranged in some form of equation. Any other mathematical values such as $\pi$ may also be added if desired. The authorized user also enters in his assigned account number, which usually comes from the bank, being displayed on a printout. The user then shifts along the alphabet display until the PIN MENU comes up. After pressing ENT, the account holder enters in a predetermined set of numbers, presses ENT again, establishes a time preference from a preset selection of values, and finally stores the data by finishing with ENT. The main advantage for allowing each account holder to enter in one's own data is the tremendous savings to the bank. A financial institution does not need to stamp on names and numbers, but can mass produce a plurality of generic calculating apparatus without making as many customizations. In addition, a C-device can be used over and over again even with different account numbers from different banks!

Figure 4:
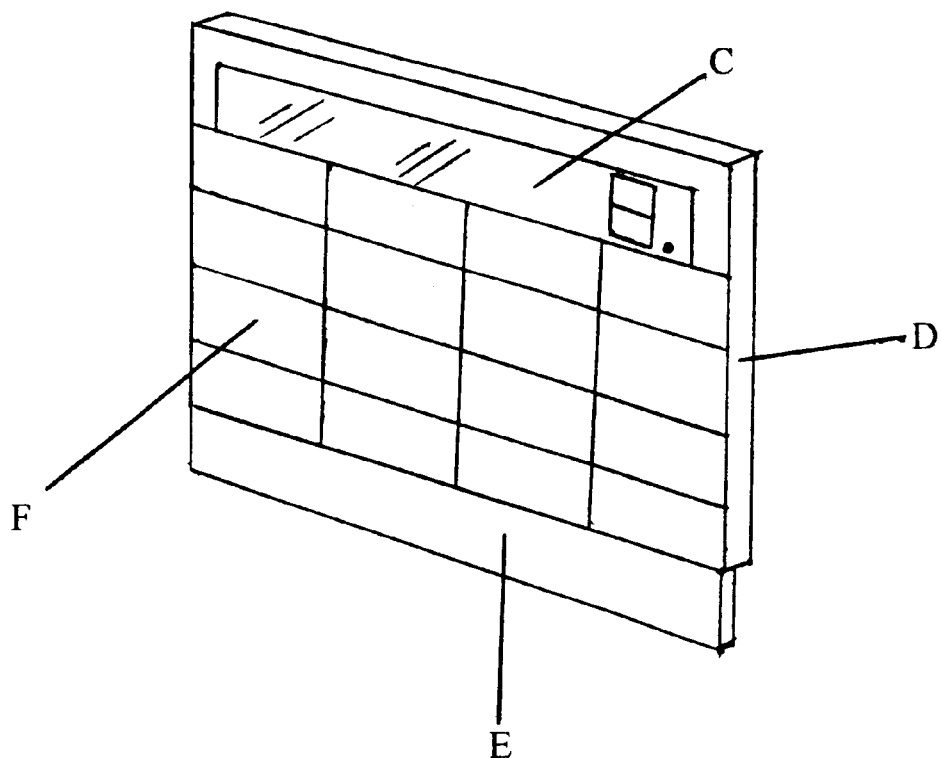
FIG. 4 is a front perspective view of the C-device of FIG. 3.

FIG. 4 displays the side view of a C-device. In the preferred embodiment, a C-device should be thin enough to allow it to be carried in a wallet or purse without taking up too much space. A replaceable or rechargeable battery can be used to store energy necessary to hold time or other data. An electronic radio transmitter is available to allow an account holder to withdraw funds from an ATM machine.

Figure 5:
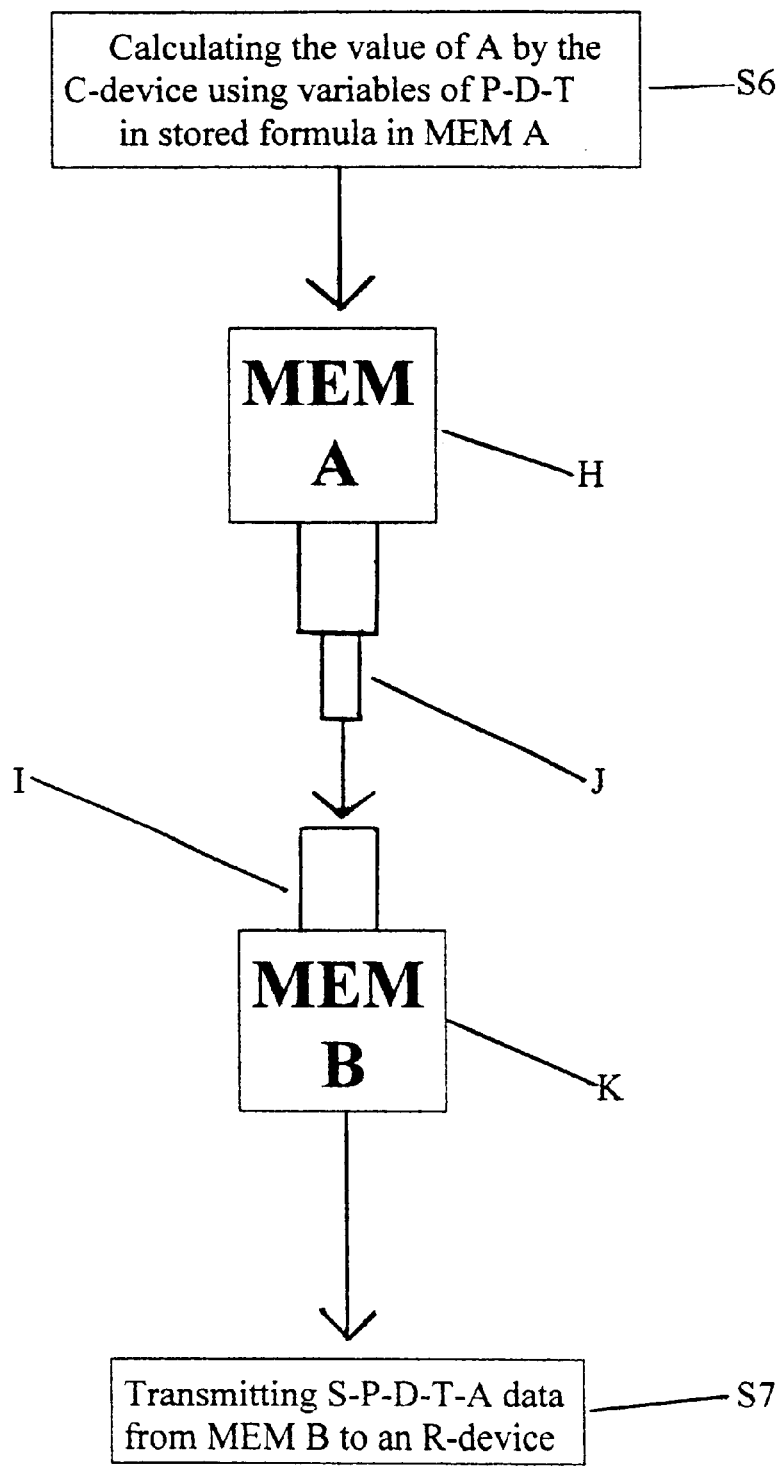
FIG. 5 is a flow diagram illustrating transmission of S-P-D-T-A data to an R-device according to the present invention.

FIG. 5 diagrams how a C-device can transmit S-P-D-T-A data to an R-device without a stored formula being read or altered during a purchase transmission. This procedure is actually an equivalent to giving a C-device a read-only-memory design. When a PIN and formula are originally stored into a C-device's memory, the data is held in MEM A. When a price is entered into a C-device, S6 is performed and the value of an authorization code is calculated in MEM A. After the calculation, the value of A and the other values of S-P-D-T are sent to MEM B along a closed circuit, the switch at J being closed. After the required data is stored in MEM B, the retractable switch at J is opened along the circuit. The switch is opened and the C-device can then perform S7 without the formula data being read during the purchase transmission. Since MEM B is also rewritible, it is important that the data within MEM A be erased completely before the switch at J is reclosed. This prevents computer viruses from "infecting" or altering the stored formula in MEM A when the switch is reclosed.

FIG. 6 diagrams how a plurality of accounts can be made or established. In S15, an account holder receives a C-device and a computer form containing his Serial number and the spelling of the account holder's name as it is to be entered into the received C-device. In reality, the account holder's full name is actually transmitted along with S-P-D-T-A data during a purchase transmission. It is not mentioned much, since the main purpose of this specification is to focus on how an authorization code is developed, and not to concentrate on how traditional credit cards are verified. It is mentioned now, however, since name verification does become important if banks are going to allow any C-device to be used for account activation. The reason is to prevent one account holder from cloning another account. A cloned account would be harder to make since a copier must also have the correct spelling of another user's name in addition to the serial number. Furthermore, the copier would also need to know the other account holder's formula in order to make charges.

In S16, the authorized user creates a PIN code and the time interval that the created PIN must be reentered. The PIN and its interval are then stored into memory of the C-device. In S17, the authorized user creates his desired formula and enters it into the C-device. At S18, the authorized user then calls his bank to activate his account and store his formula. A telephone representative then verifies identity by requiring the correct answering of questions to begin account activation. The traditional practice of verifying an authorized user by identifying the location of a call is also used. If the caller is not authorized to activate the account, the dotted line is followed to DA. The representative then enters the account holder's chosen formula, being S20, into a computer system so that a V-device has on file a copy of the method used to compute an authorization code. The bank representative can now wait for calls from others wishing to activate an account.

VII. OTHER EMBODIMENTS

Another embodiment of the present invention takes the form of an electronic checking or savings account with an account holder having calculating means to determine an authorization code. A formula is then established by the account holder by giving information to a bank's telephone representative so that said formula can be entered into a computer database so that automatic electronic withdrawals can be later verified by a V-device. Preferably, said formula should have an algebraic equation with a pre set pallet of symbols and numbers with predetermined restrictions for constructing formulas so that authorization codes having undefined values or error messages can be prevented. Other embodiments can include a method of calculating an authorization code comprising an algorithm with letters or symbols used to substitute numbers or variables.

Another embodiment of the present invention discloses a method of holding an ant electronic security deposit without causing complications to an account holder. When an account holder wants to make a security deposit to a company, he makes the exact same steps as for making a purchase. However, when the vendor receives the required S-P-D-T-A data from a card user, the vendor immediately credits back the account after a charge is made. The initial charge is just a means of determining if the account holder's given data is valid information and that the credit limit is authorized. It would be necessary since a dishonest card user not wanting to make a security deposit may give an invalid authorization code or other data. In addition, it is also necessary to place a charge-credit on file with a V-device if an account holder later changes his formula.

This procedure allows the merchant the ability of retaining an electronic security deposit without the card user being charged interest or other fees or the account holder's credit limit being lowered. In the event the formula to produce an authorization code is ever changed by the account holder and a charge-credit was prerecorded by a V-device, the old formula is conserved on file at the bank along with the exact time/date range of the formula's existence. So if a vendor, having stored S-P-D-T-A data, needs to later make a charge to the old formula configuration, the bank's record showing a charge-credit record on file may allow the charge to be authorized. This would not breach security to the account holder since a charge-credit record must first show during the old formula's time/range existence for any new charge being made using an earlier formula configuration. So if a thief cracks an earlier formula and decides to try to get funds by using an old formula configuration, not having previously made a charge-credit during said old formula's existence, the charge would not be authorized. In addition, the preferred embodiment of the present invention requires M-L information to be transmitted along with S-P-D-T-A data. Any thief running numbers may be located and investigated.

The date/time combination must also match within the life range of a formula, and any formula, to be validated. As a matter of fact, any date/time combination within the formula life range can be validated, even if the current time is different than the received data combination, as long as the other variables of S-P-A also match when a V-device substitutes them in the formula. This allows a merchant to make a charge with the same D-T combination even if an electronic security deposit is withdrawn at a much later date. In addition, it is important to provide some flexibility to a C-device or R-device since not all clocks in the world run at the same pace.

Another way to make security deposits is by making several different electronic deposits at different price levels so that a merchant can charge several different fees at predetermined time intervals. This allows a merchant to make an annual fee towards an account holder by taking recorded information all at once. Charges can be made to an account without the cardholder's further permission. This allows great convenience without compromising security measures.

Still another use of a C-device may allow the storing and balancing of all purchases made by the authorized user. In use, the C-device can store all purchases made and can automatically deduct from the available credit each time a charge is made. This allows a user to keep track, in a memory, one's own available credit since all purchases are automatically recorded in the form of an "electronic checkbook register".

VIII. SAMPLE OPERATION OF PREFERRED EMBODIMENT

Today, John gets the C-device he ordered from the bank. The C-device was sent from the bank with an account form showcasing the Serial number that John is required to store into his C-device to activate his account. The Serial number 5432-2101-2345-6789 was printed on the form and sent to John to allow him to enter in this code, whereby cutting the cost of the bank having to engrave a different Serial number, name, and expiration date on every C-device mailed out. John enters his legal name from the received form into the C-device as well. John then stores his self-created secret formula, PIN code, and the PIN code's time preference into the C-device. He calls his bank and establishes his formula F to be $D^T+P^D+T^D=A$. John sees something he wants in a catalog for $19.99 plus tax and shipping. He calls the merchant and gives the merchant his Serial number, which is the account number 5432-2101 -2345-6789 previously stored in memory of the C-device. The merchant rings up the total to be $24.65 with all charges included. John then turns on his C-device by entering the preset PIN code of 1234567. John enters $24.65 into his C-device and presses enter. The authorization code displays on the C-device's LCD screen so A=2.612471972. John presses enter again and the date and time the code was calculated with shows as Feb. 20, 2000 at 2:21:21 pm. John then gives the merchant his legal name, the time and date displayed on the C-device screen, and the authorization code to be run with the account number. The merchant number M is 654321 and the location number L of the merchant's R-device is 98765.

The merchant then manually enters the variables in the order of S-P-D-T-A into his R-device, which is attached to a modem along the internet. The R-device automatically adds the M-L data to the received data during a verification transmission. The entire combination number dials into the verifying V-device at John's bank. The V-device uses the values of the variables and notices that the authorization code 2.612471972 would indeed match for $24.65 on Feb. 20, 2000 at 2:21:21 pm.

However, the greedy merchant wants more money. He decides to run the same numbers through again but at a price of $9000! This time however, the V-device notices that at a price of $9000, the authorization code would not be the same, therefore invalidating the authorization code. The merchant tries again to rack up some more money; this time trying to use the exact same combination number. When the V-device receives the same combination number again, it will be invalidated because the verifying device knows that in real time two separate charges cannot be made at once. So once again the greedy merchant tries to guess a code by changing the time, just slightly, with the hope that it will go through. Even changing just one second on the time at 2:21:22 pm, would cause the authorization code to be 2.612469901 instead of 2.612471972. Now the merchant is really mad that the code did not authorize. After another guess at the authorization code, he is prompted that he cannot run that account number at his location for another 24 hours, which was designed to stop hackers from guessing numbers!

Three hours later, John decides to go into a store to make a purchase. He brings his merchandise to the counter and the merchant rings up the total to be $120.52. John doesn't need to enter his PIN into the C-device again, because he originally configured it to only require a PIN every six hours during the day to allow himself more shopping convenience. John enters $120.52 into his C-device to get an authorization code, A equaling 2.591797445. John then slides the C-device into the R-device to be read by the reader. Although the merchant tried to be slick and altered the R-device's computer monitor so that $500 being run along a network actually displays as $120.52 on the computer display, the value of $120.52 was still calculated in the formula because P was entered into the actual C-device and not the merchant's sneaky computer display. Furthermore, the computer virus the merchant included into the R-device has no effect to rewrite the C-device's pre stored formula because the C-device was engineered with nonrewritable means and the formula is engineered to be stored along a parallel circuit when being read along the card swipe or electronic signaler. A formula can only be read or altered when information is entered into the numeric keypad by the authorized user.

On Feb. 24, 2000, John goes to a store and wants to establish a cellular phone account. The merchant requires a $200 dollar deposit from John. John enters his PIN and price into the C-device and gets an authorization code on the screen. He slides his C-device through the card slot for payment. However, the merchant claims that his R-device didn't get the message because it is broken, so the merchant wants John to use the electronic signal device instead. In reality, John didn't know that the card slot was really working and that the greedy merchant just wants the C-device's clock to change a few seconds so another authorization code can be received by the R-device so that the merchant can double charge him. However, John knows better than this, and presses the "last charge" function on his C-device. The C-device then uses the exact same date, time, and price data so that the crooked merchant cannot receive a second authorization code with the hope of making a double charge. If the merchant runs the exact same data more than once, the V-device will invalidate the second charge because it knows that two charges cannot be allowed with the exact same D-T data.

A burglar broke into John's house while he was out shopping. John wasn't that safe and actually left a copy of his secret formula and all of his account information written on a sheet of paper. John thinks that his formula was discovered by the burglar. He calls his bank and changes his formula right away. However, several weeks later John cannot pay his cellular phone bill and the cellular phone merchant needs to withdraw the deposit of $200. The recorded S-P-D-T-A information, being on file with the merchant, are then transmitted to John's bank from the merchant's R-device. Even though the formula was just changed, the merchant had previously made a "check" on the account so the payment is allowed by the V-device. Now it's the burglar's turn to try and fraud John. Fortunately for John, the burglar didn't get the same chance to make charge-credits while John's formula was in-force so withdrawals cannot be made. However, even if the burglar had known about the charge-credit by the cellular phone merchant, the burglar's merchant identification and location numbers of M-L would not allow him to deduct any funds from John's account since he is not that merchant!

IX. CONCLUSION

Let it be known that none of the prior art references displays a concrete, systematic or convenient method for producing authorization codes without flaws. However, my disclosure and its examples clearly explain: a method of conducting an electronic security transaction without compromising security to the cardholder so that security payments and annual fees may be collected by a company, even after the later changing of a formula by the authorized user. Furthermore, the disclosed method to allow security deposits also shows: (a) a way for banks to inexpensively produce formulas and provide a calculating apparatus with its own built-in internal clock, so that merchants cannot use an authorization code with the same time data more than once on the same day, for a duplicate charge (b) a method of security for preventing a stolen card from being used by the entering of a preset PIN every predetermined time period as established by the authorized user, (c) a method of preventing a scanner from changing or reading a stored formula during a purchase, (d) a method of preventing hackers from guessing authorization codes, (e) a method of allowing security even on distant or phone orders, (f) and a method showing those in the field how to understand and use the present invention. These are among the many advantages that make the present invention novel, unobvious, and patentable over the prior art.

I claim:

1. A method of computing and verifying an authorization code for a transaction comprising the steps of:
    (a) having a user create an algebraic formula for calculation of an authorization code, said algebraic formula comprising variables of D for date, T for time, P for price of a charge and A for said authorization code, then having said user store said algebraic formula into a storage of a validation unit,
    (b) having said user enter said algebraic formula into a calculating apparatus comprising a memory for storing data and an internal clock for determining values for said variables of D for date and T for time during a calculation by pressing symbolic keypads into said calculating apparatus,
    (c) having said user make said calculation with said calculating apparatus by entering in a value for said variable of P for price by pressing said symbolic keypads on said calculating apparatus, and having said calculating apparatus determine said values for said D and T variables representing a date-time combination of said calculation, then having said calculating apparatus substitute said values for said P, D, and T variables in said algebraic formula, calculate a value for said variable A of said authorization code and assemble a string information comprising said values for said P, D T and A variables, then having a communicator of said calculating apparatus transmit said string information to a vendor system, (d) having said vendor system receive said string information, then having said vendor system transmit said string information to said validation unit, (e) having said validation unit receive said string information with said validation unit checking into its own memory to see if said date-time combination of said values for said D variable and said T variable has been used before for a previously withdrawn charge, said validation unit also substituting said values for said variables of P, D, T and A in said algebraic formula to calculate said authorization code and determine a match between said values for said variables for P, D, T and A as determined by said calculating apparatus and said values for said variables for P,D, T and A as verified by said validation unit, whereby said validation unit allows payment authorization to said vendor system only if said date-time combination of said values for said D variable and said T variable has not been used before for a previously withdrawn charge, and said match exists between said values for said variables for P, D, T and A as determined by said calculating apparatus and said values for said variables for P,D, T and A as verified by said validation unit.

2. The method of claim 1, further comprising:

supplying to said validation unit a memory for storing a quantity of invalid string information transmissions from said vendor system with said validation unit only allowing a plurality of said invalid string information transmissions from said vendor system before invalidating further transmission of string information from said vendor system for a predetermined time period, whereby a hacker is prevented from trying to guess an answer to said algebraic formula and collect an electronic payment.

3. A method of depositing and withdrawing an anti-fraud electronic bank security deposit comprising:

(a) having an authorized user create a first algorithm for calculation of an authorization code, said first algorithm having a first set of variables, and having said authorized user store said first algorithm into memory of a verification system and into a file of said authorized user, (b) having said authorized user substitute a first set of values for said first set of variables in said first algorithm and calculate a first answer corresponding to said authorization code, then having communication means transmit a first set of deposit data including said first answer and said first set of values for said first set of variables to a vendor system, (c) having said authorized user store said first set of deposit data into memories of both said vendor system and said verification system, respectively, (d) having said authorized user formulate a replacement algorithm by creating a second set of variables for computation of said authorization code and having said authorized user substitute said replacement algorithm into said memories of said verification system and said file, with said verification system also retaining in said memory of said verification system said first set of values of said first set of variables of said first algorithm and said first set of deposit data, (e) having said authorized user substitute a second set of values for said second set of variables in said replacement algorithm and calculate a second answer which equals said authorization code, then having communication means transmit a second set of deposit data including said second answer and said second set of values for said second set of variables to said vendor system, having said vendor system transmit said second set of deposit data to said verification system, and having said verification system substitute said second set of values of said second set of deposit data into said first algorithm, and having said verification system authorize payment when said second set of values of said second set of deposit data equals said first set of values of said first set of deposit data and said second answer and said second set of values corresponds with said first set of variables and said authorization code of said first algorithm, and (f) having said verification system erase said second set of deposit data from said memory of said verification system after said verification system authorizes said payment to said vendor system.

4. The method of claim 3, further comprising:

having said vendor system check a validity of said second set of deposit data by transmitting said second set of deposit data to said verification system, with said verification system then substituting said second set of values and said second answer into said first algorithm to determine a match between said first answer and said second answer, and sending a validation message back to said vendor system when said second set of values and said second answer matches said first set of values and said first answer.

5. The method of claim 3 wherein:

at least one of said first set of variables and at least one of said second set of variables is selected from the group consisting of D for date, T, for time, and P for price of a charge.

6. The method of claim 3 wherein:

said file of said authorized user comprises a calculating apparatus comprising a computer display for displaying said authorization code, numerical keypads for entering said first set of values and said second set of values, and an internal clock for determining a time and date of a calculation.

7. The method of claim 3, further comprising:

supplying to said verification system a memory for storing a quantity of invalid authorization code transmissions from said vendor system with said verification system only allowing a plurality of said invalid authorization code transmissions from said vendor system before invalidating further transmission of deposit data from said vendor system for a predetermined time period.

8. A method of depositing and withdrawing an anti-fraud electronic bank security deposit comprising the steps of:

(a) having a user create a first algebraic formula for calculation of a first authorization code A to be a resulting answer of a calculation containing a plurality of variables comprising D for date, T for time, and P for price of a charge then store said algebraic formula into a storage of a validation unit and into a memory of a calculating device, (b) having said user substitute a first set of values for said variables in said first algebraic formula and calculate said first authorization code, then having a communicator transmit a first set of security deposit information comprising said first authorization code and said first set of values, to a checking system, (c) having said checking system store said first set of security deposit information and transmit said first set of security deposit information to a validation unit, (d) having said validation unit receive said first set of security deposit information and then substitute said first set of values and said first authorization code of said first set of security deposit information into said first algebraic formula to determine a match between said first authorization code as calculated by said calculating device and said first authorization code as calculated by said validation unit, (e) having said validation unit transmit a validation message from said validation unit to said checking system when said first authorization code as determined by said validation unit matches said first authorization code as determined by said calculating device and said validation unit verifies said first set of values of said first set of security deposit information, (f) having said user replace said first algebraic formula with a replacement algebraic formula having a replacement set of variables in said memory of said calculating device and in said storage of said valication unit, and having said validation unit retain said first algebraic formula and said first set of security deposit information, (g) having said validation unit receive a second set of security deposit information having a second set of values, from a given checking system, then having said validation unit substitute said second set of values of said second set of security deposit information into said first algebraic formula to calculate a second authorization code and allow payment withdrawal when said second authorization code and said second set of values corresponds with said first authorization code and said first set of values, and (h) invalidating said second set of security deposit information from said storage of said validation unit after said payment withdrawal is authorized to the checking system.

9. A method of depositing and withdrawing an anti-fraud electronic bank security deposit comprising the steps of:

(a) having a user create an algebraic formula having a plurality of variables for computation of a first authorization code, then storing said algebraic formula into a storage of a validation unit and into a memory of a calculating device, (b) having said user substitute a first set of values for said variables in said algebraic formula to calculate said first authorization code, then having a communicator transmit a first set of security deposit information comprising said first authorization code and said first set of values, to a merchant system, (c) having said user store said first set of security deposit information into a memory of said merchant system and into said storage of said validation unit, (d) having said validation unit receive a second set of security deposit information having a second set of values, from a given merchant system, said validation unit then substituting said second set of values of said second set of security deposit information back into said algebraic formula to calculate a second authorization code and allowing payment withdrawal to said given merchant system when said second set of values of said second set of security deposit information corresponds with said first set of security deposit information, and said second authorization code and said second set of values also corresponds with said first set of values and said first authorization code, and (e) voiding out said first set of security deposit information from said storage of said validation unit after a payment is authorized to said merchant system.

10. The method of claim 9, further comprising:

having said merchant transmit said second set of security deposit information to said validation unit and having said validation unit substitute said second set of security deposit information back into said algebraic formula, having said validation unit determine a match, and having said validation unit transmit a validation message back to said merchant system when said second set of security deposit information and said second authorization code matches said first set of security deposit information and said first authorization code, whereby said merchant system can verify that said second set of security deposit information is valid so that an electronic payment may be collected by said merchant system at a later date as needed by said merchant system.

11. The method of claim 9, wherein:

said plurality of variables of said algebraic formula comprises variables of D for date, T, for time, and P for price of a charge.

12. The method of claim 9 wherein said calculating device comprises:

a computer display for showcasing said first authorization code and said second authorization code, numerical keypads for entering in said first set of values, said second set of values and said algebraic formula, and an internal clock for determining a time and date of a calculation.

13. The method of claim 9 further comprising:

supplying to said validation unit a memory for storing a quantity of invalid security deposit transmissions from a given merchant system with said validation unit only allowing a plurality of said invalid security deposit transmissions from said given merchant system before invalidating further transmission of security deposit transmissions from said given merchant system for a predetermined time period.

14. A method of computing and verifying an authorization code for a transaction comprising the steps of:

(a) having a user create an algorithm having a plurality of variables for calculation of an authorization code, and storing said algorithm into a memory of a verification system, (b) having said user enter said algorithm into a calculating apparatus comprising a memory for storing data and an internal clock by pressing symbolic keypads into said calculating apparatus, (c) having said user enter values for said variables in said algorithm by pressing said symbolic keypads on said calculating apparatus, said calculating apparatus substituting said values for said variables in said algorithm and calculating said authorization code in an authorization code calculation, said calculating apparatus determining a time figure representing a time of said authorization code calculation, then having said calculating apparatus transmit said authorization code, said values, and said time figure to a reading system, (d) having said reading system receive said authorization code, said values, and said time figure, said reading system transmitting said: authorization code, said values and said time figure to a verification system, (e) having said verification system receive said authorization code, said values, and said time figure with said verification system checking into its own memory to see if said time figure has been used before for a previously withdrawn charge, said verification system also substituting said values and said authorization code in said algorithm to calculate said authorization code and determine a match between said authorization code as calculated by said calculating device and said authorization code as calculated by said verification system, whereby said verification system allows payment authorization to a vendor of said reading system only if said time figure has not been used before for a previously withdrawn charge and said authorization code as calculated by said verification system also corresponds with said authorization code as calculated by said calculating device.

15. The method of claim 14, further comprising:

providing a memory to said verification system, storing in said memory, a charge-credit by said vendor to an account, a timepoint T of said charge-credit, and said algorithm during said timepoint T of said charge-credit, said verification system allowing a: price P of a charge in said charge-credit to be deducted from said account as long as a new data transmission from a reading system includes said timepoint T, and said authorization code as calculated by said verification system corresponds with said authorization code as calculated by said calculating device.

16. The method of claim 14, further comprising:

providing said verification system with a memory for storing a quantity of invalid authorization code transmissions from a reading system, and having said verification system count and allow a predetermined quantity of said invalid authorization code transmissions from said reading system before invalidating, for a predetermined time period, further transmission of invalid authorization code transmissions from said reading system, whereby said verification system has an ability of slowing down a vendor from guessing a valid authorization code.

* * * * *